United States Patent Office  2,844,867
Patented July 29, 1958

2,844,867

DIP BRAZING

Donald E. Wernz, Baltimore County, and Melvin M. Schwartz, Baltimore, Md., assignors to The Martin Company, Middle River, Md., a corporation of Maryland No Drawing. Application June 24, 1955
Serial No. 517,924

2 Claims. (Cl. 29—487)

The present invention relates to a novel high temperature method of dip-brazing ferrous and non-ferrous metals including titanium. More particularly, the present invention relates to a novel high temperature method of dip-brazing ferrous and non-ferrous metals using high melting fillers and in the practice of which the metals to be brazed are first preheated and then immersed in an inert molten salt bath.

Perhaps the principal obstacle to high temperature brazing is surface oxidation of the metals being brazed at the elevated temperatures to which they are subjected during the brazing operation. It is well appreciated that surface oxidation of the metals being worked upon can cause weakening of the brazing joint and frequently complete failure. Surface oxidation generally results from the high temperatures to which the metals being brazed must be brought before the brazing operation can be initiated. Although it would be preferable if the temperature of the metals being worked on did not exceed the critical value at which surface oxidation occurs while they were being brazed, it is not possible to hold down the temperature while using a high melting filler. High temperature brazing has as yet not been fully explored nor has a way been found to overcome the obstacle of surface oxidation with any degree of consistency up to the advent of the present invention.

Accordingly, it is an object of the present invention to provide a novel high temperature process for brazing ferrous and non-ferrous metals using high melting fillers and during the practice of which the metals are not subjected to a temperature at which surface oxidation occurs prior to the actual brazing operation, and during and after the brazing operation, the metals are completely protected from surface oxidation. This is generally accomplished by means of the present invention through the use of an inert molten salt bath which functions as a flux bath during the brazing operation. The metals to be brazed are initially preheated to a temperature below the critical temperature at which surface oxidation occurs and thereafter, the metals are introduced into the inert molten salt flux bath wherein their temperatures rise very rapidly to the brazing temperature. At this time, however, it will be evident that the inert molten salt flux bath will completely protect the metals being brazed and will thus preclude altogether the danger of surface oxidation at the elevated temperatures of the brazing.

Other and further objects of the present invention will become more fully apparent from the following detailed description of the present invention.

Various types of ferrous and non-ferrous metals can be brazed by the new techniques advanced by the present invention. For example, it is entirely possible to braze non-heat-treatable steels and heat-treatable steels (low carbon, low alloy, and stainless), titanium, titanium alloys, "Inconel," an alloy consisting essentially of Ni—72%, Cr—15%, Fe—8%, Mn—1% and minor quantities of other elements, "Inconel X," an alloy consisting essentially of Ni—70%, Cr—15%, Fe—5% to 9%, Ti—2.5%, and minor quantities of Co, Ta, Al, Si, Mn and others, the last two mentioned alloys being made by International Nickel Corp., and any other high temperature metal having a melting point over about 2,000° F. Surface oxidation of steel occurs at about 875° F. whereas for titanium surface oxidation occurs at about 750° F. It will be appreciated that surface oxidation at elevated temperatures is especially troublesome in conjunction with the handling of titanium and for this reason the present invention has particular application in brazing titanium.

Various fillers can be used in the brazing operation and they may be in the form of sheets, rods or other solid configurations, or alternatively, they may be in the form of powders or pastes. As examples of the various fillers which can be used, there may be mentioned pure copper sheet coated with Handy and Harman flux, a composition of fluorides and chlorides and prepared commercially by the Handy and Harman Company of New York, pure silver without flux, silver-manganese alloy sheet comprised essentially of 85% silver and 15% manganese, manganese-nickel alloy sheet comprising essentially of 68% manganese and 32% nickel, an alloy of Ag—70% and Pt—30%, an alloy of Pl—60% and Si—40%, an alloy of Pd—53% and Ni—47%, an alloy of Pd—60% and Cu—40%, an alloy of Nb—52% and Ni—48%, an alloy of Ni—84% and Ti—16%, an alloy of Ni—80% and Mn—20%, an alloy of Fe—50% and Pd—50%, "Coast Metal Powders #51 and #53" which alloys consisting essentially of Ni—82% to 91%, Si—4%, B—2% to 3%, Cr—7% to 10% and Fe—3% and are by Coast Metals Co. of Little Ferry, New Jersey, and "Nicro-Braz" an alloy consisting essentially of Ni and Co—65% to 75%, Si—4%, Cr—13% to 20%, Fe—4%, B—3.8% and C—1%, made by the Wall Colmonoy Co. of Detroit, Michigan. As a consequence of using the last two mentioned fillers especially strong ductile and corrosion resistant joints are obtained. As will be evident, any alloy or element may be employed as the filler material which has a high melting point. By high melting point is meant 1670° F. or higher. Most of the materials mentioned above having a melting point in the range of from about 2000° F. to about 2350° F.

In carrying out the method of the present invention the parts to be joined are first assembled in the relationship to be established by the joining operation. Thereafter, a filler which may be a material of those mentioned above is either cut to size and shape in the case of a solid filler or brushed on as in the case of a powdered filler at or near the proposed line or point of juncture of the parts to be joined. Thereafter, the assembly is introduced into a preheated furnace which operates at a temperature below the critical temperature at which surface oxidation will occur on the parts of the assembly. In the case of steel, it will be appreciated that surface oxidation will occur at a temperature about 875° F. For titanium oxidation occurs at about 700° F to 750° F. Inasmuch as surface oxidation will prevent a successful braze, it is recommended that the preheat furnace be operated at a temperature from about 700° F. to 800° F. depending upon the nature of the metals being brazed.

When the parts have attained the temperature of the preheat furnace, they are removed and immediately introduced into a molten salt bath. According to the method of the present invention, the salt bath should be inert and function essentially as a molten flux bath. As examples of the bath there may be mentioned barium chloride, either alone or in combination with strontium chloride. The salts forming the bath are, of course, heated to a molten state preparatory to receiving the assembly from the preheat furnace.

The flux bath may be composed of 100% $BaCl_2$ in which event it will become molten at about 1800° F. and will start to fume off at about 2400° F. A recommended operating temperature for this bath would be about 2300° F. to 2350° F. As another example, the flux bath may be composed af 85% $BaCl_2$ and 15% $SrCl_2$ in which event the bath will become molten at about 1700° F. and will start to fume off at about 2200° F. A recommended operating temperature for this bath would be about 2100° F. to 2200° F. By increasing the proportion of $SrCl_2$ to $BaCl_2$ the bath would become molten at lower temperatures. Actually any materials may be used for the flux bath provided they are inert and would be molten at temperatures above about 1700° F. The materials specifically mentioned above are, however, preferred. The lowest braze temperature is about 1675° F. there being no upper limit other than what is not physically possible. It is preferred that the operating temperature of the flux bath be about 300° F. above the temperature at which it becomes molten and above the melting temperature of the filler if this is possible.

Most of the materials mentioned as fillers are characterized by a high melting point. This is true for the solid fillers as well as the powders. In general, it can be said that the fillers, both metals and powders are of the high melting variety and melt within the temperature range of from about 1760° F. to about 2400° F. There is no upper limit other than what is available for the flux bath.

It is apparent that the assembly, when removed from the preheat furnace, is at a temperature not in excess of 800° F. In order for brazing to occur in view of the high melting fillers, it is necessary for the assembly to attain a much higher temperature. Upon being dipped into or introduced into the molten flux bath which is at a temperature greatly in excess of 800° F. the assembly will be heated to brazing temperature in a relatively short time. Actual experience indicates that the time required for an assembly to attain brazing temperature is from about one minute 30 seconds, to about two minutes 15 seconds. Care should be taken not to leave the parts to be braded in the flux bath for too great a time as the condition of the metal may be substantially altered in an undesirable manner. Actually, the braze time should be as short as possible. While in the salt bath, the assembly will be completely isolated from the ambient atmosphere and hence during the temperature rise from about 800° F. to brazing temperature the molten flux bath will, in effect, form a salt envelope about the assembly thus preventing surface oxidation at the brazing temperature. When the assembly is taken out of the flux bath, the molten salt envelope surrounding the brazed joint freezes forming a protective coating. This aspect of the method of the present invention is particularly beneficial since the assembly when removed from the flux bath is at a temperature well above the critical temperature at which surface oxidation occurs. The salt envelope has special advantages in conjunction with the brazing of titanium because at the elevated temperatures there is a danger of embrittlement resulting from contamination with oxygen, nitrogen, and hydrogen.

In the case of brazing titanium and its alloys, it is preferred that the filler material be either pure silver or a silver-manganese alloy. The advantages of the present method are quite evident in conjunction with brazing titanium since surface oxidation is a particularly troublesome obstacle in the handling of titanium. The process of the present invention, however, overcomes this obstacle since at the brazing temperature, the titanium parts are completely sealed from the atmosphere by means of the molten salt bath envelope.

Although the present invention has been shown and described with reference to a specific embodiment nevertheless various changes and modifications obvious to one skilled in the art are within the spirit, scope and contemplation of the present invention.

What is claimed is:

1. A method of dip-brazing parts of titanium using high melting point brazing material and a molten salt bath of inert material, which comprises the steps of assembling the parts to be joined, placing the high melting point brazing material at the juncture of the parts, preheating the assembled parts to a temperature in the range of approximately 700° F. to 800° F., dipping the assembled parts into the molten salt bath maintained at a temperature in the range of approximately 2100° F. to 2300° F. to melt the brazing material and braze the parts together, and removing the parts from the salt bath and permitting the salt to remain on the parts to exclude the air while the parts are cooling.

2. The method of claim 1 wherein the assembled parts are permitted to remain in the molten salt bath for a period of approximately one minute thirty seconds to two minutes fifteen seconds.

References Cited in the file of this patent

UNITED STATES PATENTS

| | | |
|---|---|---|
| 2,191,631 | Shutts et al. | Feb. 27, 1940 |
| 2,298,996 | Woods | Oct. 13, 1942 |
| 2,417,662 | Rosales | Mar. 8, 1947 |
| 2,443,574 | Burns | June 15, 1948 |
| 2,714,760 | Boam et al. | Aug. 9, 1955 |
| 2,732,321 | Gill et al. | Jan. 24, 1956 |
| 2,786,265 | Keay | Mar. 26, 1957 |

OTHER REFERENCES

Metals Handbook, 1939 Edition, pages 317–321, published by American Society for Metals, Cleveland, Ohio. (Copy in Division 14.)